United States Patent
Zhu et al.

(10) Patent No.: US 11,056,748 B2
(45) Date of Patent: Jul. 6, 2021

(54) PROTECTION DEVICE USED IN BATTERY PACK, BATTERY PACK AND VEHICLE

(71) Applicant: BYD COMPANY LIMITED, Shenzhen (CN)

(72) Inventors: Jianhua Zhu, Shenzhen (CN); Qing Lai, Shenzhen (CN); Zhiwei Tong, Shenzhen (CN); Yan Zhu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 144 days.

(21) Appl. No.: 16/474,828

(22) PCT Filed: Jul. 5, 2017

(86) PCT No.: PCT/CN2017/091902
§ 371 (c)(1),
(2) Date: Jun. 28, 2019

(87) PCT Pub. No.: WO2018/120732
PCT Pub. Date: Jul. 5, 2018

(65) Prior Publication Data
US 2020/0127252 A1     Apr. 23, 2020

(30) Foreign Application Priority Data
Dec. 30, 2016 (CN) .......................... 201611260035.4

(51) Int. Cl.
*H01M 2/34* (2006.01)
*H01M 50/209* (2021.01)
(Continued)

(52) U.S. Cl.
CPC ....... *H01M 50/209* (2021.01); *H01M 50/578* (2021.01); *H01M 50/581* (2021.01); *H01M 2200/103* (2013.01); *H01M 2220/20* (2013.01)

(58) Field of Classification Search
CPC ............. H01M 50/209; H01M 50/578; H01M 50/581; H01M 2200/103; H01M 2220/20; H01M 50/572; H01M 2/345
See application file for complete search history.

(56) References Cited

U.S. PATENT DOCUMENTS

2004/0247994 A1* 12/2004 Masuda ................ H01M 10/48
429/66
2005/0118501 A1* 6/2005 Hashimoto ......... H01M 2/0232
429/180
(Continued)

FOREIGN PATENT DOCUMENTS

| CN | 101997131 A | 3/2011 |
| CN | 103782468 A | 5/2014 |

(Continued)

OTHER PUBLICATIONS

English Translation of International Search Report from PCT/CN2017/091902 dated Oct. 19, 2017 (2 pages).

*Primary Examiner* — Michael L Dignan
(74) *Attorney, Agent, or Firm* — Calfee Halter & Griswold LLP

(57) ABSTRACT

A battery pack comprises a plurality of batteries. The protection device is disposed between two adjacent batteries and comprises: a first connecting assembly, a second connecting assembly and a conductive connecting assembly. The protection device has a normal state and an alarm state. When the protection device is in the normal state, the first connecting assembly and the second connecting assembly are spaced apart, and the overload protection circuit is open. When the protection device is in the alarm state, the first connecting assembly is electrically connected with the housing of the first battery, the second connecting assembly is electrically connected with the housing of the second battery, at least one of the first connecting assembly and the (Continued)

second connecting assembly moves to be electrically connected with each other, and the overload protection circuit is closed.

20 Claims, 4 Drawing Sheets

(51) Int. Cl.
*H01M 50/578* (2021.01)
*H01M 50/581* (2021.01)

(56) References Cited

U.S. PATENT DOCUMENTS

| | | | | |
|---|---|---|---|---|
| 2010/0247980 | A1* | 9/2010 | Jang | H01H 71/12 |
| | | | | 429/10 |
| 2011/0037430 | A1* | 2/2011 | Jang | B60L 58/15 |
| | | | | 320/109 |
| 2011/0039147 | A1* | 2/2011 | Cheon | H01M 10/42 |
| | | | | 429/159 |
| 2013/0122346 | A1* | 5/2013 | Jiang | H01M 2/18 |
| | | | | 429/143 |
| 2014/0127549 | A1* | 5/2014 | Roh | H01M 2/30 |
| | | | | 429/150 |
| 2014/0248523 | A1* | 9/2014 | Roh | H01M 2/345 |
| | | | | 429/121 |
| 2015/0140373 | A1 | 5/2015 | Han et al. | |
| 2015/0180016 | A1* | 6/2015 | Choi | H01M 2/345 |
| | | | | 429/61 |
| 2015/0380778 | A1* | 12/2015 | Kim | H01M 10/425 |
| | | | | 429/61 |

FOREIGN PATENT DOCUMENTS

| | | |
|---|---|---|
| CN | 103931025 A | 7/2014 |
| CN | 104577185 A | 4/2015 |
| CN | 104733791 A | 6/2015 |
| CN | 204927218 U | 12/2015 |
| CN | 204946982 U | 1/2016 |
| EP | 2284929 A1 | 2/2011 |
| EP | 2768047 A1 | 8/2014 |
| EP | 2960966 A1 | 12/2015 |
| JP | 2015002113 A | 1/2015 |
| KR | 20160000742 A | 1/2016 |
| WO | 2009057893 A1 | 5/2009 |

* cited by examiner

US 11,056,748 B2

PROTECTION DEVICE USED IN BATTERY PACK, BATTERY PACK AND VEHICLE

CROSS-REFERENCE TO RELATED APPLICATIONS

This application is the U.S. national phase entry of PCT Application No. PCT/CN2017/091902, filed Jul. 5, 2017, which claims priority to and benefits of Chinese Patent Application No. 201611260035.4, filed with the State Intellectual Property Office of P. R. China on Dec. 30, 2016. The entire contents of the above-referenced applications are incorporated herein by reference.

FIELD

The present disclosure relates to the technical fields of batteries, and in particular, to a protection device for a battery pack, a battery pack and a vehicle.

BACKGROUND

Due to the limited internal space of a vehicle, batteries in a battery pack of the vehicle are densely arranged. When the battery pack of the vehicle is under a high load and works for a long time, it is easy to result in overheating of the batteries. In addition, in the case of over-charge, over-temperature and short circuit of the battery pack, there is also a problem of heat expansion, which may easily cause the battery pack to ignite or even explode. In the related art, a battery module is short-circuit protected and overcharge-protected by a battery management system (BMS) and a fuse (FUSE) system, but it not only is costly, but also cannot achieve short-circuit protection between battery cells. Moreover, the protection mode is active protection, which is low in reliability and relatively poor in versatility.

SUMMARY

An objective of the present disclosure is to at least resolve one of the technical problems in the related art to some extent. In view of this, the present disclosure provides a protection device for a battery pack. The protection device for a battery pack has the advantages of simple structure and good reliability.

The present disclosure is also directed to a battery pack. The battery pack includes the above protection device.

The present disclosure also provides a vehicle. The vehicle includes the above battery pack.

Embodiments of the present disclosure provide a protection device for a battery pack. The battery pack includes a plurality of batteries. The protection device is disposed between two adjacent batteries and includes: a first connecting assembly, the first connecting assembly corresponding to a first battery in the two adjacent batteries, and the first connecting assembly being adapted to be electrically connected with a housing of the first battery; a second connecting assembly, the second connecting assembly corresponding to a second battery in the two adjacent batteries, the second connecting assembly being adapted to be electrically connected with a housing of the second battery, and the second connecting assembly being opposite to the first connecting assembly; and a conductive connecting assembly, the conductive connecting assembly being used for being electrically connected with terminals of the first battery and the second battery, and adapted to be electrically connected with the first connecting assembly and the second connecting assembly, respectively, to be configured as an overload protection circuit. The protection device has a normal state and an alarm state, when the protection device is in the normal state, the first connecting assembly and the second connecting assembly are spaced apart, and the overload protection circuit is open. When the protection device is in the alarm state, the first connecting assembly is electrically connected with the housing of the first battery, the second connecting assembly is electrically connected with the housing of the second battery, at least one of the first connecting assembly and the second connecting assembly moves to be electrically connected with each other, and the overload protection circuit is short-circuited.

For the protection device for a battery pack according to the embodiments of the present disclosure, by providing the protection device between two adjacent batteries, when the battery has a safety hazard such as over-charge, short circuit, or over-temperature, the first connecting assembly and the second connecting assembly are driven to be electrically connected with each other to close the overload protection circuit. After the overload protection circuit is closed, an internal circuit of the battery pack may be fused to prevent the battery pack from being exposed to fires and explosions, thereby improving the safety performance of the battery pack. Moreover, the protection device has a simple structure, low cost and reliable operation. In addition, the protection device is passive protection, thereby improving the reliability of the protection device, overcoming the safety hazards of fires and explosions for the battery pack after the failure of a battery management system (BMS), and the protection device may be used as the second protection after the failure of the BMS.

According to some embodiments of the present disclosure, the conductive connecting assembly includes: a connecting piece, the connecting piece having a weakened area that is fused when the protection device is in the alarm state.

According to some embodiments of the present disclosure, the weakened area has a plurality of through holes spaced apart from one another.

According to some embodiments of the present disclosure, the thickness of the weakened area on the connecting piece is less than the thickness of the remaining positions on the connecting piece.

According to some embodiments of the present disclosure, the first connecting assembly and the second connecting assembly each include: a mounting base, the mounting base being provided with a mounting hole; and a contact unit, the contact unit being received in the mounting hole of the mounting base, the contact unit of the first connecting assembly being adapted to be in contact with the contact unit of the second connecting assembly.

According to some embodiments of the present disclosure, the contact units of the first connecting assembly and the second connecting assembly each include: an elastic member, the elastic member fitting in the mounting hole of the mounting base, a through hole being defined in the elastic member; and a contact portion, the contact portion being movably disposed in the through hole of the elastic member, the contact portion comprising a first end facing the battery opposite to the contact portion and a second end facing away from the battery opposite to the contact portion.

According to some embodiments of the present disclosure, when the protection device is in the normal state, the first ends of the contact portions of the first connecting assembly and the second connecting assembly extend from the mounting hole of the mounting base respectively, and the second end of the contact portion of the first connecting assembly is spaced apart from the second end of the contact portion of the second connecting assembly; and when the protection device is in the alarm state, the contact portion of the first connecting assembly and the contact portion of the second connecting assembly move toward each other until the second end of the contact portion of the first connecting assembly is in contact with the second end of the contact portion of the second connecting assembly to close the overload protection circuit.

According to some embodiments of the present disclosure, the first connecting assembly and the second connecting assembly each further include: a temperature relay, the temperature relay being connected with the contact unit.

According to some embodiments of the present disclosure, the mounting base includes a mounting groove, the mounting groove being communicated with the mounting hole, and the temperature relay being received in the mounting groove.

According to some embodiments of the present disclosure, the temperature relay is a memory alloy elastic piece or a bi-metal elastic piece.

According to some embodiments of the present disclosure, the mounting base of the first connecting assembly includes a plurality of assembly holes spaced apart from each other along the circumferential direction of the mounting base; the mounting base of the second connecting assembly includes a plurality of assembly holes spaced apart from each other along the circumferential direction of the mounting base; and the plurality of assembly holes on the first connecting assembly and the plurality of assembly holes on the second connecting assembly are in one-to-one correspondence.

According to some embodiments of the present disclosure, the protection device further includes a plurality of connecting members, each connecting member respectively passing through and fitting in one assembly hole of the first connecting assembly and one assembly hole of the second connecting assembly corresponding to the assembly hole of the first connecting assembly.

The battery pack according to embodiments of the present disclosure includes: a plurality of batteries; a separator, the separator being disposed between two adjacent batteries; and a protection device according to the above embodiments of the present disclosure, the protection device being embedded on the separator, a first connecting assembly of the protection device corresponding to a first battery in the two adjacent batteries and being adapted to be electrically connected with a housing of the first battery, a second connecting assembly of the protection device corresponding to a second battery in the two adjacent batteries and being adapted to be electrically connected with a housing of the second battery, and a conductive connecting assembly of the protection device being electrically connected with terminals of the first battery and the second battery.

For the battery pack according to the embodiments of the present disclosure, by providing the protection device between two adjacent batteries, when the battery has a safety hazard such as over-charge, short circuit, or over-temperature, the first connecting assembly and the second connecting assembly are driven to be electrically connected with close the overload protection circuit. After the overload protection circuit is closed, an internal circuit of the battery pack may be fused to prevent the battery pack from being exposed to fires and explosions, thereby improving the safety performance of the battery pack. In addition, the protection device is passive protection, thereby improving the reliability of the protection device, overcoming the safety hazards of fires and explosions for the battery pack after the failure of a battery management system (BMS), and the protection device may be used as the second protection after the failure of the BMS.

According to some embodiments of the present disclosure, the housing of each battery is provided with a pressure activation piece, the pressure activation piece corresponding to the first connecting assembly or the second connecting assembly, and the pressure activation piece being electrically connected with the housing of the battery. When the protection device is in an alarm state, the pressure activation piece is adapted to push one of the first connecting assembly and the second connecting assembly to move toward the other one, such that the first connecting assembly and the second connecting assembly are electrically connected with each other.

The vehicle according to an embodiment of the present disclosure includes the battery pack according to the above embodiments of the present disclosure.

For the vehicle according to the embodiments of the present disclosure, by assembling the above battery pack, when the battery has a safety hazard such as over-charge, short circuit, or over-temperature, the first connecting assembly and the second connecting assembly are driven to be electrically connected with close the overload protection circuit. After the overload protection circuit is closed, an internal circuit of the battery pack may be fused to prevent the battery pack from being exposed to fires and explosions, thereby improving the safety performance of the battery pack, and further improving the overall safety of the vehicle.

Figure 1:
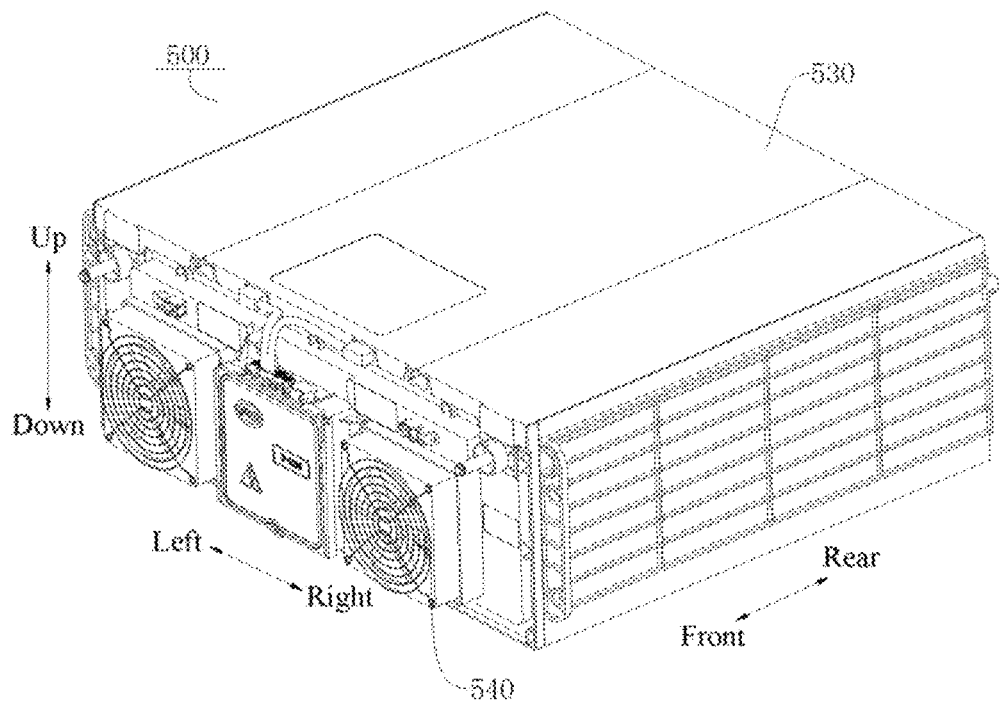
FIG. 1 is a schematic structural view of a battery pack according to an embodiment of the present disclosure.

REFERENCE NUMERALS OF THE ACCOMPANYING DRAWING protection device 100,
first connecting assembly 10,
second connecting assembly 20, mounting base 110, connecting member 113, temperature relay 114, mounting hole 115, assembly hole 116, mounting groove 117, contact unit 120, elastic member 121, contact portion 122, first end 1221 of contact portion 122, second end 1222 of contact portion 122, conductive connecting assembly 30, connecting piece 310, weakened area 311, through hole 312, clamping hole 313, connecting hole 314, battery pack 500, battery 510, pressure activation piece 511, separator 520, housing 530, and cooling system 540.

DETAILED DESCRIPTION

The following describes embodiments of the present invention in detail. Examples of the embodiments are shown in the accompanying drawings. The embodiments described below with reference to the accompanying drawings are exemplary, aim to explain the disclosure, but cannot be understood as a limitation on the disclosure.

In the description of the present disclosure, it should be understood that, orientations or position relationships indicated by terms such as "length", "width", "thickness", "up", "down", "front", "back", "left", "right", "vertical", "horizontal", "top", "bottom", "inner", "outer", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In addition, terms "first" and "second" are used only for description purposes, and shall not be understood as indicating or suggesting relative importance or implicitly indicating a quantity of indicated technical features. Therefore, features defined by "first" and "second" may explicitly or implicitly include at least one feature. In the description of the present disclosure, unless otherwise specifically limited, "multiple" means at least two, for example, two or three.

In the present disclosure, unless otherwise clearly specified and limited, terms "mount", "connected", "connect", and "fix" should be understood in a generalized manner, for example, may be understood as fixed connection, detachable connection, or integration; or may be understood as mechanical connection, electrical connection, or mutual communication; or may be understood as direct connection, or indirect connection by means of a medium, or internal communication of two elements or a mutual relationship between two elements, unless otherwise clearly specified. A person of ordinary skill in the art may understand specific meanings of the foregoing terms in this disclosure according to a specific situation.

A protection device 100 for a battery pack 500, a battery pack 500 and a vehicle according to an embodiment of the present disclosure will be described below with reference to FIGS. 1-8.

As shown in FIGS. 1-8, the battery pack 500 according to an embodiment of the present disclosure includes a plurality of batteries 510, the protection device 100 being disposed between two adjacent batteries 510. The protection device 100 according to an embodiment of the present disclosure includes: a first connecting assembly 10, a second connecting assembly 20 and a conductive connecting assembly 30. The protection device 100 for the battery pack 500 may be applied to a vehicle.

Specifically, as shown in FIGS. 5-8, the first connecting assembly 10 corresponds to one of the two adjacent batteries 510, and the second connecting assembly 20 corresponds to the other one of the two adjacent batteries 510. That is, the first connecting assembly corresponds to a first battery in two adjacent batteries, and the second connecting assembly corresponds to a second battery in the two adjacent batteries. The second connecting assembly 20 is opposite to the first connecting assembly 10. In other words, the first connecting assembly 10 and the second connecting assembly 20 are disposed opposite to each other between two adjacent batteries 510. There is a certain gap between the first connecting assembly 10 and the second connecting assembly 20 (e.g., may be 1-1.2 mm), the first connecting assembly 10 and one battery 510 may have a gap (i.e., 0.5 mm) or abut against each other, and the second connecting assembly 20 and the other battery 510 may also have a gap (i.e., 0.5 mm) or abut against each other. The first connecting assembly is adapted to be electrically connected with a housing of the first battery, the second connecting assembly is adapted to be electrically connected with a housing of the second battery, and the conductive connecting assembly 30 is used for being electrically connected with terminals of the first battery and the second battery, and adapted to be electrically connected with the first connecting assembly 10 and the second connecting assembly 20, respectively, to be configured as an overload protection circuit.

Figure 2:
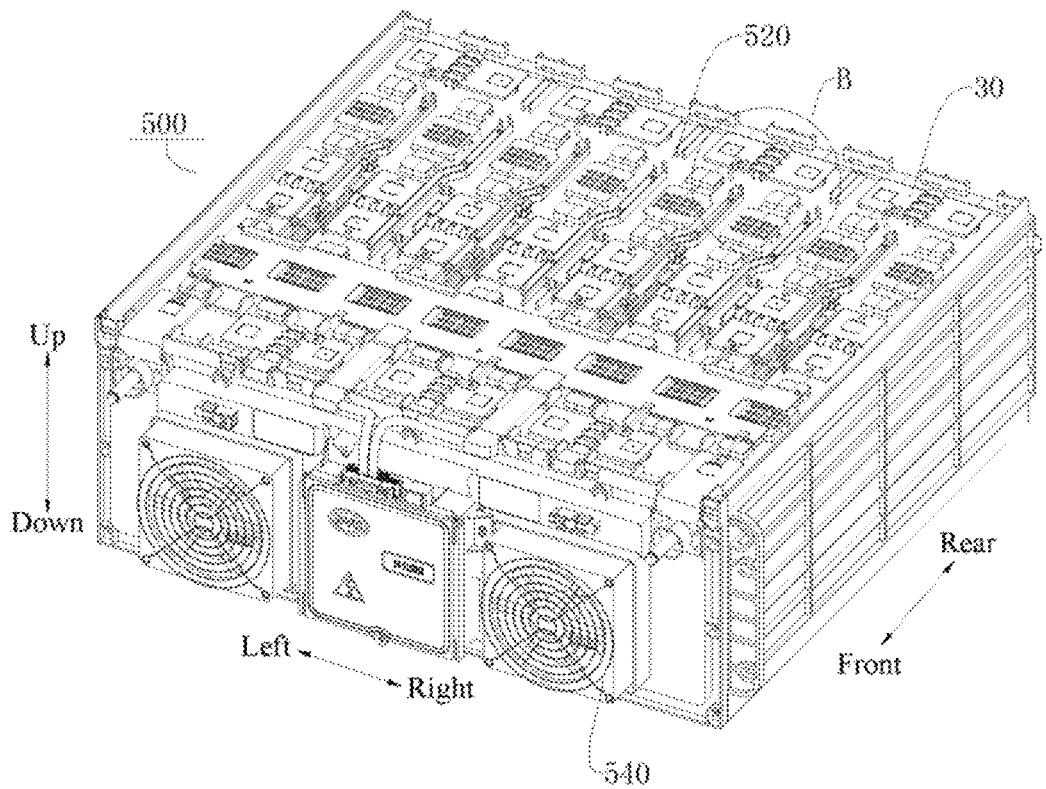
FIG. 2 is a schematic structural view of the battery pack shown in FIG. 1, where a housing of the battery pack is removed.

As shown in FIG. 1 and FIG. 2, the battery pack 500 has a housing 530, and a plurality of batteries 510 may be disposed inside the housing 530. The batteries 510 may be arranged in a regular matrix inside the housing 530 or in other forms. Since the mounting space for the battery pack 500 in the vehicle is limited, the batteries 510 in the battery pack 500 are arranged densely. When the battery pack 500 is operated under a heavy load, the battery 510 is prone to heat generation, thereby causing a risk of fire, explosion and the like. However, for the protection device 100 for the battery pack 500 according to an embodiment of the present disclosure, the protection device 100 is disposed between two adjacent batteries 510, and the first connecting assembly 10 and the second connecting assembly 10 may be disposed opposite to each other between the two adjacent batteries 510. When the battery pack 500 has a safety hazard, the first connecting assembly 10 and the second connecting assembly 20 are adapted to be electrically connected with each other to close the overload protection circuit, and the closed overload protection circuit may protect the battery pack 500.

The protection device 100 has a normal state and an alarm state. When the protection device 100 is in the normal state, the batteries 510 of the battery pack 500 according to an embodiment of the present disclosure are connected with each other by the conductive connecting assembly 30 to form a charge or discharge loop. The first connecting assembly 10 and the second connecting assembly 20 are spaced apart from each other. That is, the first connecting assembly 10 and the second connecting assembly 20 are disconnected from each other, that is, the overload protection circuit is in a disconnected state. It will be appreciated that the protection device 100 in the normal state means that the battery pack 500 is in a stable and safe working state.

When the protection device 100 is in the alarm state, at least one of the first connecting assembly 10 and the second connecting assembly 20 moves to be electrically connected with each other. At this time, the overload protection circuit is closed. It will be appreciated that the protection device 100 in the alarm state means that the battery pack 500 is in an unsafe working state such as over-charge, short circuit and over-temperature.

For example, when the temperature of one of the batteries 510 in the battery pack 500 is too high, the battery 510 is thermally expanded, and the housing of the expanded battery 510 extrudes the protection device 100 between the battery 510 and a battery 510 adjacent thereto, so that the housing of the expanded battery 510 is electrically connected with the first connecting assembly 10 or the second connecting assembly 20, and the first connecting assembly 10 or the second connecting assembly 20 is allowed to move, whereby the first connecting assembly 10 is in contact with the second connecting assembly 20 to form an electrical connection therebetween. That is, the first connecting assembly 10 and the second connecting assembly 20 are electrically connected with the housing of one of the adjacent batteries respectively, and at least one of the first connecting assembly 10 and the second connecting assembly 20 moves to be electrically connected with each other. The adjacent batteries are electrically connected by the conductive connecting assembly 30, and the short circuit of cells is achieved by the polarity of the housings of the adjacent batteries.

For example, in general, the housing of the battery has the same polarity as a negative electrode of the battery, and if the conductive connecting assembly 30 is connected with a positive terminal of the first battery and a negative terminal of the second battery in the adjacent batteries, so that the adjacent batteries are connected in series. When the protection device 100 is in the alarm state, the first connecting assembly 10 is electrically connected with the housing of the first battery, the second connecting assembly 20 is electrically connected with the housing of the second battery, and the first connecting assembly 10 and the second connecting assembly 20 are electrically connected with each other. That is, when the protection device 100 is in the alarm state, the negative electrodes of the first battery and the second battery are directly electrically connected. At this time, the positive terminal of the first battery is electrically connected with a negative housing of the first battery through the conductive connecting assembly 30, the negative terminal of the second battery, and the second connecting assembly 20 (having the same polarity as the negative terminal of the second battery) and the first connecting assembly 10 sequentially, that is, a short circuit is formed between the positive and negative electrodes of the first battery, a large current is generated, and then the conductive connecting assembly 30 is fused. At this time, the overload protection circuit may be closed and an internal circuit of the battery pack 500 may be fused, and an abnormal battery (i.e., an expanded or bulged battery) is thus disconnected from a charge or discharge circuit to prevent the battery pack 500 from being exposed to fires and explosions, thereby improving the safety performance of the battery pack 500.

For the protection device 100 for the battery pack 500 according to an embodiment of the present disclosure, by providing the protection device 100 between two adjacent batteries 510, when the battery 510 has a safety hazard such as over-charge, short circuit, or over-temperature, the first connecting assembly 10 and the second connecting assembly 20 are electrically connected with close the overload protection circuit. After the overload protection circuit is closed, the internal circuit of the battery pack 500 may be fused to prevent the battery pack 500 from being exposed to fires and explosions, thereby improving the safety performance of the battery pack 500. Moreover, the protection device 100 has a simple structure, low cost and reliable operation. In addition, the protection device 100 is passive protection, thereby improving the reliability of the protection device 100, overcoming the safety hazards of fires and explosions for the battery pack 500 after the failure of a battery management system (BMS), and the protection device 100 may be used as the second protection after the failure of the BMS.

Figure 3:
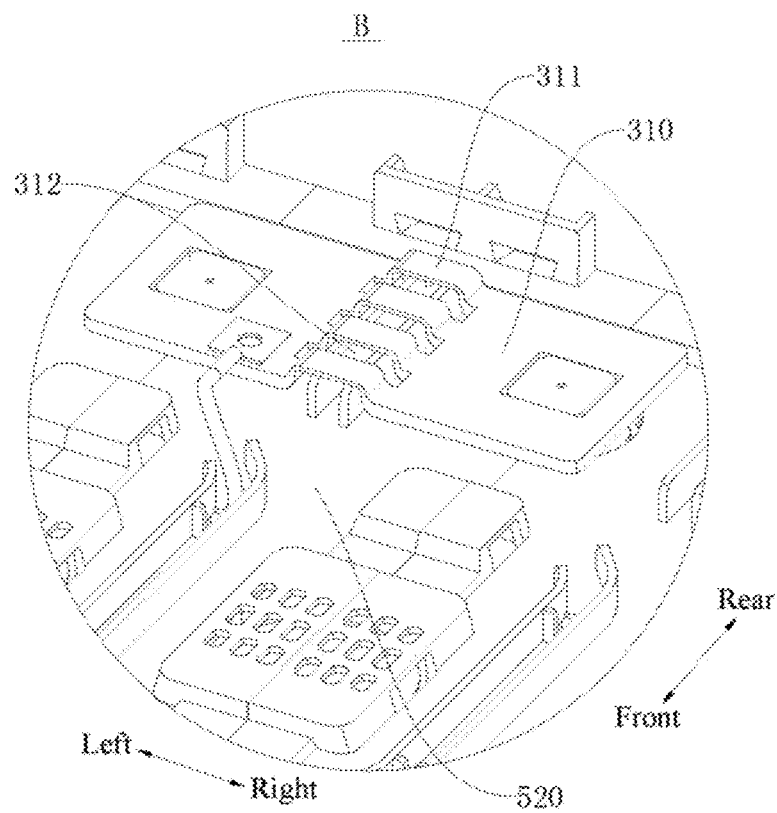
FIG. 3 is a partial enlarged view of Part B circled in FIG. 2.
Figure 4:
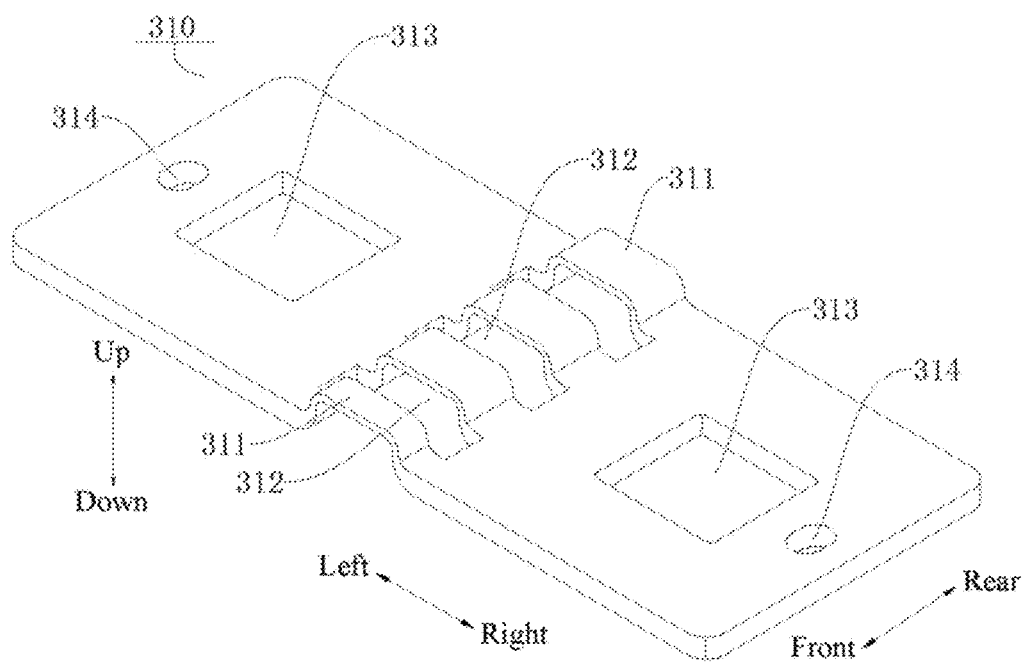
FIG. 4 is a schematic structural view of a connecting piece of a protection device for a battery pack according to an embodiment of the present disclosure.

According to one embodiment of the present disclosure, as shown in FIGS. 2-4, the conductive connecting assembly 30 includes a connecting piece 310. The connecting piece 310 has a weakened area 311. When the protection device 100 is in the alarm state, the weakened area 311 is fused. In some embodiments, the weakened area 311 may perform matching design according to different capacities and types of the battery 510. For example, the weakened area 311 may be designed such that when a current of 600 A flows through the weakened area 311, the weakened area 311 is fused within 10 S. After the weakened area 311 is fused, the internal circuit of the battery pack 500 is cut off, thus protecting the battery pack 500.

Further, the weakened area 311 may be provided with a plurality of through holes 312 spaced apart. For example, as shown in the example of FIG. 4, the connecting piece 310 has a symmetrical structure, along the length direction of the connecting piece 310 (i.e., left-right direction in FIG. 4), the connecting piece 310 is provided with a weakened area 311 at a middle position thereof, the weakened area 311 protrudes upward to form a bridge portion, and the weakened area 311 is provided with a plurality of through holes 312 spaced apart. In some embodiments of the present disclosure, as the thickness of the weakened area 311 (i.e., dimension in an up-down direction shown in FIG. 4) is smaller, the width (i.e., dimension in a front-rear direction shown in FIG. 4) is smaller. As the capability of current carrying of the weakened area 311 is weaker, the weakened area 311 may be fused at a low current within a short time. Thus, according to the capacity and type of the battery 510, by providing a plurality of through holes 312 in the weakened area 311 and adjusting the size of the weakened area 311, the over-charge, over-temperature and short-circuit protection requirements for different battery packs 500 can be satisfied.

In some embodiments of the present disclosure, the thickness of the weakened area 311 on the connecting piece 310 may be less than the thickness of the remaining positions on the connecting piece 310. As shown in FIG. 4, the thickness (i.e., dimension in an up-down direction shown in FIG. 4) of the weakened area 311 at the middle of the connecting piece 310 is less than the thickness (i.e., dimension in an up-down direction shown in FIG. 4) of the remaining positions on the connecting piece 310. It will be appreciated that, as shown in FIG. 4, the weakened area 311 at the middle position of the connecting piece 310 protrudes upward, and the thickness of the weakened area 311 is small, so that when the battery pack 500 has a safety hazard, the weakened area 311 can be fused in time, the internal circuit of the battery pack 500 can be cut off, and the battery pack 500 can be protected. Since the connecting piece 310 needs to be fixed to the partition 520, each end of the connecting piece 310 is provided with a clamping hole 313 and a connecting hole 314 to facilitate the fixed assembly of the connecting piece 310. The thickness of the left and right ends of the connecting piece 310 is large to ensure the structural strength of the connecting piece 310, and to prevent breakage when the connecting piece 310 is fixed, thereby enhancing the fixing reliability and stability of the connecting piece 310.

Figure 7:
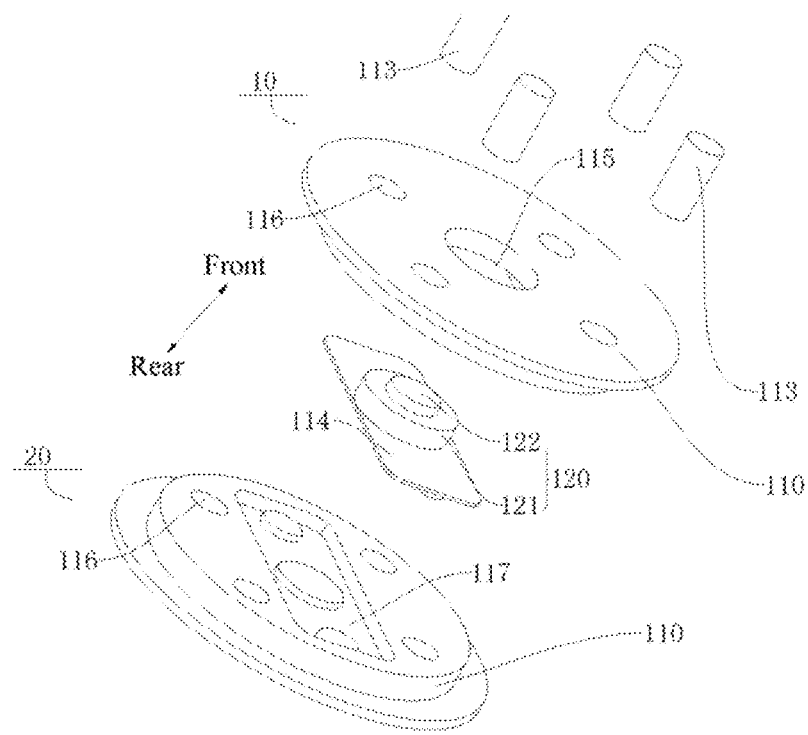
FIG. 7 is a schematic structural view of a protection device for a battery pack in which a first connecting assembly is shown in an explosive manner and a second connecting assembly is shown in a non-explosive manner according to an embodiment of the present disclosure.
Figure 8:
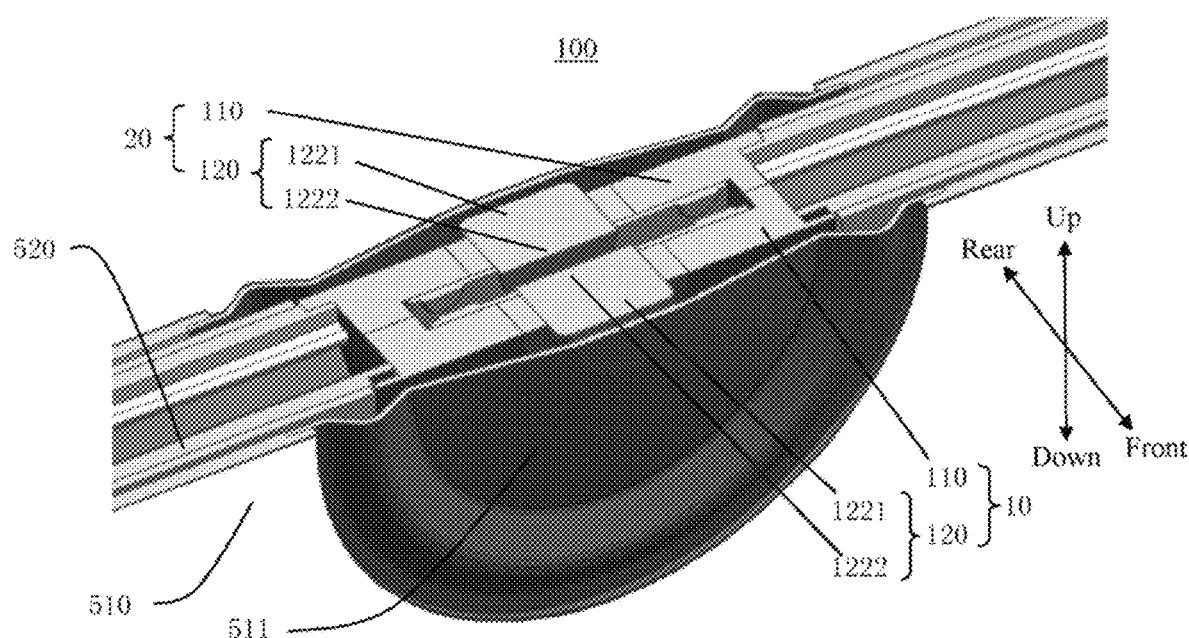
FIG. 8 is a cross-sectional view of a protection device for a battery pack according to an embodiment of the present disclosure.

According to some embodiments of the present disclosure, as shown in FIGS. 7 and 8, the first connecting assembly 10 and the second connecting assembly 10 have the same structure, and thus the first connecting assembly 10 is taken as an example to describe the structure of the first connecting assembly 10 and the second connecting assembly 20. As shown in FIG. 7, the first connecting assembly 10 is shown in an explosive manner, and the first connecting assembly 10 includes a mounting base 110 and a contact unit 120. The contact unit 120 is embedded into the mounting base 110, thereby facilitating assembly of the contact unit 120. The contact unit 120 of the first connecting assembly 10 is adapted to be in contact with the contact unit 120 of the second connecting assembly 20, such that the first connecting assembly 10 and the second connecting assembly 20 are electrically connected. Thus, when the battery pack 500 has a safety hazard such as over-temperature, over-charge and short circuit, the first connecting assembly 10 may be electrically connected with the second connecting assembly 20, thereby closing the overload protection circuit to protect the battery pack 500.

Further, as shown in FIGS. 7 and 8, the contact unit 120 includes: an elastic member 121 and a contact portion 122. The elastic member 121 is provided with a through hole. The contact portion 122 is movably disposed in the through hole of the elastic member 121. In addition, a mounting hole 115 is provided in the mounting base 110, and the elastic member 121 with the contact portion 122 may be received in the mounting hole 115 of the mounting base 110. In some embodiments of the present disclosure, the contact portion 122 may be made of metal having a low electrical resistivity, such as red copper. In order to improve the oxidation resistance of the contact portion 122 and reduce the contact resistance, the contact portion 122 may be subjected to treatment such as silver plating, gold plating, or nickel plating.

In some embodiments of the present disclosure, the contact portion 122 includes a first end 1221 facing the battery 510 opposite to the contact portion 122 and a second end 1222 facing away from the battery 510 (i.e., facing another contact portion 122) opposite to the contact portion 122. When the protection device 100 is in the normal state, the first end 1221 of the contact portion 122 extends from the mounting hole 115 of the mounting base 110 under the action of the elastic member 121, and the second end 1222 of the contact portion 122 is spaced apart from the second end 1222 of another contact portion 122, thereby preventing accidental contact of the two contact portions 120. When the protection device 100 is in the alarm state, the battery 510 corresponding to the contact portion 122 applies an acting force to the first end 1221 of the contact portion 122 to push the contact portion 122 toward another contact portion 122 against the acting force of the elastic member 121 until the second ends 1222 of the two contact portions 122 are in contact with each other to close the overload protection circuit.

Figure 5:
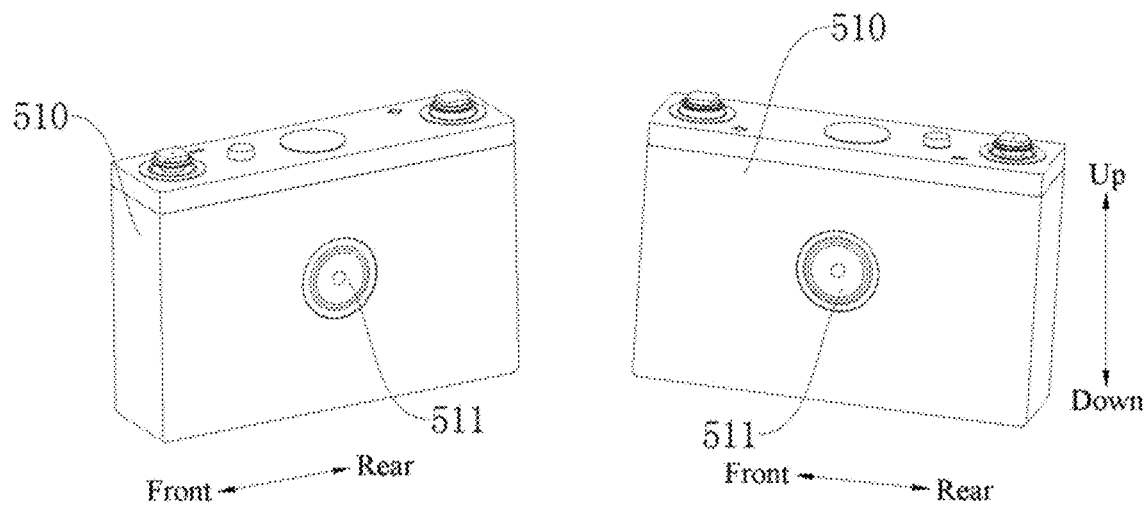
FIG. 5 is a partial exploded view of a battery pack in which two batteries arranged in a front-rear direction are shown in an explosive manner according to an embodiment of the present disclosure.

In some embodiments of the present disclosure, as shown in FIG. 5, a pressure activation piece 511 may be disposed at a middle position, corresponding to the protection device 100, of the battery 510. The pressure activation piece 511 is electrically connected with the housing of the battery 510. The pressure activation piece 511 and the mounting base 110 (specifically, the contact portion 122) may abut against each other or have a small gap (e.g., 0.5 mm). When there is a safety hazard in the battery pack 500, for example, when the temperature of the battery 510 is too high, the pressure activation piece 511 located on the battery 510 is changed from a concave state to a convex state, thereby being in electrical contact with the contact portion 122 of one connecting assembly to push the contact portion 122 of this connecting assembly to move toward the contact portion 122 of another connecting assembly, and being in electrical contact with the contact portion 122 of this connecting assembly to close the overload protection circuit, so as to protect the battery pack 500.

In some embodiments of the present disclosure, the first connecting assembly 10 may further include a temperature relay 114. The contact unit 120 is disposed on the temperature relay 114. The temperature relay 114 and the contact unit 120 are embedded together on the mounting base 110. As shown in FIG. 7, the contact unit 120 may be disposed on a surface of the temperature relay 114 facing the mounting base 110. Accordingly, a mounting groove 117 may be defined on the mounting base 110 for receiving the temperature relay 114. As shown in FIGS. 7 and 8, the temperature relay 114 has a rectangular piece shape, and the mounting groove 117 has a rectangular shape and is provided on the surface of the mounting base 110 facing away from the corresponding battery 510. For the first connecting assembly 10, the mounting groove 117 is provided on a rear surface of the mounting base 110 of the first connecting assembly 10. For the second connecting assembly 20, the mounting groove 117 is provided on a front surface of the mounting base 110 of the second connecting assembly 20. In some embodiments of the present disclosure, the depth (i.e., dimension in the front-rear direction shown in FIGS. 7 and 8) of the mounting groove 117 is greater than the thickness (i.e., dimension in the front-rear direction shown in FIGS. 7 and 8) of the temperature relay 114, such that when the first connecting assembly 10 and the second connecting assembly 20 are mounted in position, the distance between the contact unit 120 of the first connecting assembly 10 and the contact unit 120 of the second connecting assembly 20 is 1-1.2 mm. In addition, the mounting groove 117 is communicated with the mounting hole 115 such that the temperature relay 114 and the contact unit 120, assembled together, may be embedded together into the mounting base 110.

The temperature relay 114 may be deformed according to a temperature change, so that the two contact units 120 opposite to each other may be driven to close the overload protection circuit. When the protection device 100 is in the normal state, the temperature relay 114 is not deformed, the first end 1221 of the contact portion 122 extends from the mounting hole 115 of the mounting base 110 under the action of the elastic member 121, and the second end 1222 of the contact portion 122 is spaced apart from the second end 1222 of another contact portion 122, thereby preventing accidental contact of the two contact portions 120. When the protection device 100 is in the alarm state, for example, when the temperature of the battery 510 is too high, exceeding a critical temperature (e.g., 80° C.) of the temperature relay 114, the temperature relay 114 of the first connecting assembly 10 is bent toward the temperature relay 114 of the second connecting assembly 20 (i.e., backward as shown in FIG. 8) to resist the acting force of the elastic member 121 to urge the contact portion 122 of the first connecting assembly 10 to move toward the contact portion 122 of the second connecting assembly 20 (i.e., backward as shown in FIG. 8). Meanwhile, the temperature relay 114 of the second connecting assembly 20 may also be bent toward the temperature relay 114 of the first connecting assembly 10 (i.e., forward as shown in FIG. 8) to resist the acting force of the elastic member 121 to urge the contact portion 122 to move (i.e., forward as shown in FIG. 8), such that the contact portion 122 of the first connecting assembly 10 is in contact with the contact portion 122 of the second connecting assembly 20 to close the overload protection circuit. Thus, the weakened area 311 of the connecting piece 310 is fused, thereby cutting off the internal circuit of the battery pack 500, achieving over-temperature protection of the battery pack 500, and making the battery pack 500 operate more stably and reliably. To ensure the normal operation of the temperature relay 114, the temperature relay 114 may be fixed in the mounting groove 117 at the circumferential edge thereof, that is, the circumferential edge of the temperature relay 114 cannot move, while a central region of the temperature relay 114 may still be backward or may protrude backward, that is, the deformation occurs.

In some embodiments of the present disclosure, the temperature relay 114 may be a memory alloy elastic piece or a bi-metal elastic piece. However, the present disclosure is not limited to this. For example, the temperature relay 114 may also be other temperature relays. In actual production, the temperature relay 114 may be selected accordingly according to the temperature protection range of the battery pack 500 to accurately and reliably achieve over-temperature protection of the battery pack 500.

In a specific embodiment of the present disclosure, the mounting base 110 may be in the shape of a disk and provided with a cylindrical mounting hole 115 at its center. The elastic member 121 and the contact portion 122 are both cylindrical, and the contact portion 122 is disposed in the cylindrical through hole on the elastic member 121. The mounting base 110 may also be provided with an assembly hole 116. As shown in FIG. 7, a plurality of assembly holes 116 are spaced apart in the circumferential direction of the mounting base 110 of the first connecting assembly 10, and a plurality of assembly holes 116 are also spaced apart in the circumferential direction of the mounting base 110 of the second connecting assembly 20. The assembly holes 116 in the mounting base 110 of the first connecting assembly 10 are in one-to-one correspondence with the assembly holes 116 in the mounting base 110 of the second connecting assembly 20. The protection device 100 further includes connecting members 113. Each connecting member 113 respectively passes through and fits in the assembly hole 116 in the mounting base 110 of the first connecting assembly 10 and the corresponding assembly hole 116 in the mounting base 110 of the second connecting assembly 20, so as to achieve a stable assembly between the first connecting assembly 10 and the second connecting assembly 20.

In some embodiments of the present disclosure, the connecting member 113 may be a columnar pin, and the assembly hole 116 may be a cylindrical through hole. As shown in FIG. 7, the protection device 100 includes four columnar pins 113. Correspondingly, four cylindrical through holes 116 are spaced apart in the circumferential direction of the mounting base 110 of the first connecting assembly 10, and four cylindrical through holes 116 are spaced apart in the circumferential direction of the mounting base 110 of the second connecting assembly 20. Thus, the first connecting assembly 10 and the second connecting assembly 20 may be assembled together conveniently and efficiently by the fit between the columnar pins and the cylindrical through holes.

In some embodiments of the present disclosure, the protection device 100 for the battery pack 500 may further include a negative temperature coefficient (NTC) temperature sensor and a battery management system (BMS). The NTC temperature sensor consists of an NTC thermistor and a probe, and the resistance value thereof drops rapidly as the temperature rises. Thus, the corresponding temperature can be determined by measuring the resistance value of the NTC temperature sensor, thereby achieving the purpose of detecting and controlling the temperature. The NTC temperature sensor is distributed on the connecting piece 310. The BMS may collect and analyze temperature data to start and stop a cooling system 540 of the battery pack 500. Thus, when the battery pack 500 has a safety hazard during short circuit, over-charge, over-discharge, overload or collision, the protection device 100 for the battery pack 500 may perform the following triple protection in sequence.

First protection: the battery pack 500 is protected by the NTC temperature sensor and the BMS. The BMS collects and analyzes temperature data of the battery 510 when the battery 510 has a safety hazard and generates heat. When the temperature of the battery 510 reaches a certain set value, the BMS activates the cooling system 540, and the cooling system 540 cools the battery 510 to achieve temperature drop protection for the battery pack 500. When the BMS or the cooling system 540 fails, the first protection fails and the temperature of the battery 510 continues to rise.

Second protection: when the first protection fails, the temperature of the battery 510 continues to rise; when the temperature of the battery 510 reaches an activation temperature of the temperature relay 114, the temperature relay 114 in the protection device 100 deforms and drives the first connecting assembly 10 to be electrically connected with the second connecting assembly 20 such that a short circuit is made between adjacent batteries 510, the connecting piece 310 is fused, and a main loop current of the battery pack 500 is cut off.

Third protection: when the first protection and the second protection fail, the temperature of the battery 510 continues to rise and the battery 510 is bulged and expanded; before an explosion-proof valve of the battery pack 500 is activated, the battery 510 is bulged to extrude the pressure activation piece 511, the pressure activation piece 511 drives the first connecting assembly 10 and the second connecting assembly 20 which are opposite to each other to be electrically connected such that a short circuit is made between adjacent batteries 510, the connecting piece 310 is fused, and a main loop current of the battery pack 500 is cut off.

Thus, when the battery pack 500 has a safety hazard, the battery pack 500 may be triple-protected by the protection device 100 for the battery pack 500. When the first protection fails, the second protection may be activated; when both the first protection and the second protection fail, the third protection may be activated, thereby further enhancing the safety of the battery pack 500.

The protection device 100 for the battery pack 500 according to an embodiment of the present disclosure will be described in detail below with reference to FIGS. 1-8 in a specific embodiment. It will be appreciated that the following description is only illustrative and not specifically restrictive to the present disclosure.

As shown in FIG. 1 and FIG. 2, the battery pack 500 is externally provided with a housing 530. The battery pack 500 has a plurality of batteries 510. The plurality of batteries 510 are arranged in a regular matrix inside the housing 530, and a protection device 100 is disposed between two adjacent batteries 510.

As shown in FIGS. 3-7, the protection device 100 includes: a first connecting assembly 10, a second connecting assembly 20 and a conductive connecting assembly 30. The first connecting assembly 10 and the second connecting assembly 20 are disposed opposite to each other between two adjacent batteries 510, and there is a certain gap between the first connecting assembly 10 and the second connecting assembly 20. The conductive connecting assembly 30 is electrically connected with the first connecting assembly 10 and the second connecting assembly 20, respectively, to form an overload protection circuit. Thus, when the first connecting assembly 10 and the second connecting assembly 20 are electrically connected, the overload protection circuit may be closed. As shown in FIG. 5, a pressure activation piece 511 is disposed at a middle position, corresponding to the protection device 100, of the battery 510.

The protection device 100 has a normal state and an alarm state. When the protection device 100 is in the normal state, the first connecting assembly 10 and the second connecting assembly 20 are spaced apart, and the overload protection circuit is disconnected. When the protection device 100 is in the alarm state, at least one of the first connecting assembly 10 and the second connecting assembly 20 moves to be electrically connected with each other. The overload protection circuit is closed.

As shown in FIGS. 2-4, the conductive connecting assembly 30 includes a connecting piece 310. The connecting piece 310 is located above the battery pack 500 (as shown in an up-down direction in FIG. 2). As shown in FIG. 4, the connecting piece 310 has a symmetrical structure, and along a left-right direction of the connecting piece 310 (left-right direction as shown in FIG. 4), the connecting piece 310 is provided with a weakened area 311 at a middle position thereof. The weakened area 311 protrudes upward to form a bridge portion, and the weakened area 311 is provided with a plurality of through holes 312 spaced apart. The thickness of the weakened area 311 on the connecting piece 310 is less than the thickness of the remaining positions on the connecting piece 310. When the protection device 100 is in the alarm state, the weakened area 311 is fused. Each end of the connecting piece 310 is provided with a clamping hole 313 and a connecting hole 314 to facilitate the fixed assembly of the connecting piece 310. In other words, a left end of the connecting piece 310 is provided with a clamping hole 313 and a connecting hole 314, and a right end of the connecting piece 310 is also provided with a clamping hole 313 and a connecting hole 314. The clamping hole 313 at the left end of the connecting piece 310 and the clamping hole 313 at the right end of the connecting piece 310 are symmetrically arranged, and the connecting hole 314 at the left end of the connecting piece 310 and the connecting hole 314 at the right end of the connecting piece 310 are symmetrically arranged.

As shown in FIGS. 7 and 8, the second connecting assembly 20 is identical in construction to the first connecting assembly 10. Specifically, as shown in FIG. 7, the first connecting assembly 10 includes: a mounting base 110 and a contact unit 120. The contact unit 120 includes an elastic member 121 and a contact portion 122. The elastic member 121 is provided with a through hole. The contact portion 122 is disposed in the through hole of the elastic member 121. The mounting base 110 is provided with a mounting hole 115 at the center thereof, and the contact unit 120 fits in the mounting hole 115. The first connecting assembly 10 further includes a temperature relay 114. The contact unit 120 is disposed on the temperature relay 114. As shown in FIGS. 7 and 8, in the first connecting assembly 10, the contact unit 120 is disposed on a front surface of the temperature relay 114; and in the second connecting assembly 20, the contact unit 120 is disposed on a rear surface of the temperature relay 114. The temperature relay 114 is a rectangular sheet-shaped bi-metal elastic piece. The mounting base 110 defines a mounting groove 117. The mounting groove 117 is communicated with the mounting hole 115, and the shape of the mounting groove 117 matches the shape of the temperature relay 114, whereby the temperature relay 114 and the contact unit 120 assembled together may be received in the mounting groove 117 and the mounting hole 115 respectively.

In addition, the mounting base 110 has a disk-shaped structure and is provided with four assembly holes 116 spaced apart from each other in the circumferential direction thereof. The protection device 100 further includes four connecting members 113 configured as columnar pins. The connecting member 113 passes through the assembly hole 116 in the mounting base 110 of the first connecting assembly 10 to fit in the assembly hole 116 in the mounting base 110 of the second connecting assembly 20, thereby efficiently assembling the first connecting assembly 10 and the second connecting assembly 20 together.

In addition, the protection device 100 for the battery pack 500 further includes a negative temperature coefficient (NTC) temperature sensor and a battery management system (BMS). The NTC temperature sensor consists of an NTC thermistor and a probe, and the resistance value thereof drops rapidly as the temperature rises. Thus, the corresponding temperature can be determined by measuring the resistance value of the NTC temperature sensor, thereby achieving the purpose of detecting and controlling the temperature. The NTC temperature sensor is distributed on the connecting piece 310. The BMS may collect and analyze temperature data to start and stop a cooling system 540. Thus, when the battery pack 500 has a safety hazard during short circuit, over-charge, over-discharge, overload or collision, the protection device 100 for the battery pack 500 may perform the following triple protection in sequence.

First protection: the battery pack 500 is protected by the NTC temperature sensor and the BMS. The BMS collects and analyzes temperature data of the battery 510 when the battery 510 has a safety hazard and generates heat. When the temperature of the battery 510 reaches a certain set value, the BMS activates the cooling system 540, and the cooling system 540 cools the battery 510 to achieve temperature drop protection for the battery pack 500. When the BMS or the cooling system 540 fails, the first protection fails and the temperature of the battery 510 continues to rise.

Second protection: when the first protection fails, the temperature of the battery 510 continues to rise; when the temperature of the battery 510 reaches an activation temperature of the temperature relay 114, the temperature relay 114 inside the protection device 100 deforms and drives the first connecting assembly 10 to be electrically connected with the second connecting assembly 20 such that a short circuit is made between adjacent batteries 510, the connecting piece 310 is fused, and a main loop current of the battery pack 500 is cut off.

Third protection: when the first protection and the second protection fail, the temperature of the battery 510 continues to rise and the battery 510 is bulged and expanded; before an explosion-proof valve of the battery pack 500 is activated, the battery 510 is bulged to extrude the pressure activation piece 511, the pressure activation piece 511 drives the first connecting assembly 10 and the second connecting assembly 20 which are opposite to each other to be electrically connected such that a short circuit is made between adjacent batteries 510, the connecting piece 310 is fused, and a main loop current of the battery pack 500 is cut off.

Thus, when the battery pack 500 has a safety hazard, the battery pack 500 may be triple-protected by the protection device 100 for the battery pack 500. When the first protection fails, the second protection may be activated; when both the first protection and the second protection fail, the third protection may be activated, thereby further enhancing the safety of the battery pack 500. Moreover, the protection device 100 is simple in structure, low in cost and reliable in operation. In addition, the protection device 100 overcomes the safety hazards of fires and explosions for the battery pack 500 after the failure of the BMS, and enhances the safety performance of the battery pack 500.

The battery pack 500 according to an embodiment of the present disclosure, as shown in FIG. 1 and FIG. 2, includes: a plurality of batteries 210 spaced apart, a separator 520 and the above protection device 100.

Figure 6:
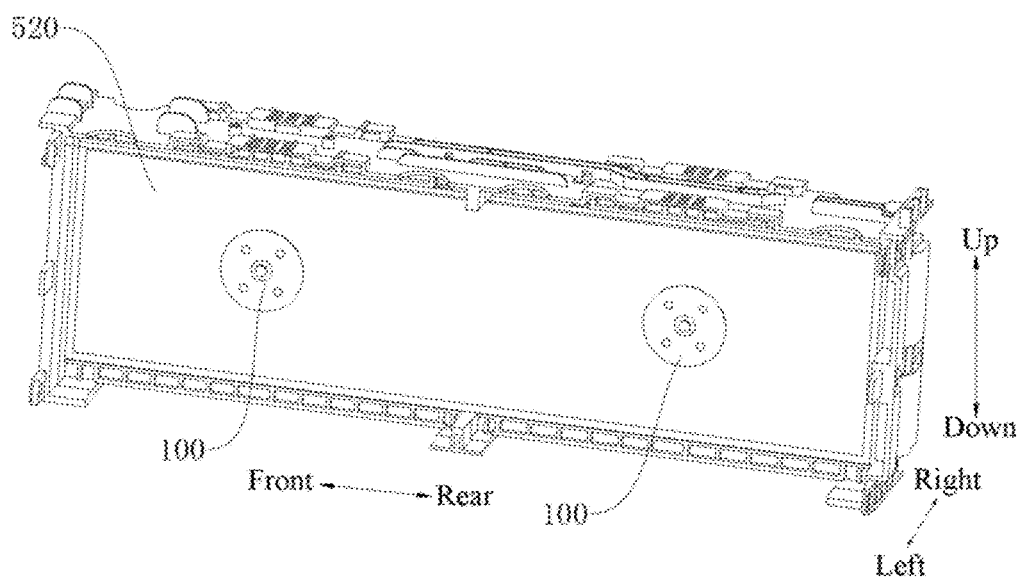
FIG. 6 is a partial schematic structural view of a battery pack in which two protection devices arranged on a separator of the battery pack in a front-rear direction are shown according to an embodiment of the present disclosure.

As shown in FIG. 6, the separator 520 is disposed between two batteries 510 adjacent in a left-right direction, and the separator 520 is provided with two protection devices 100 in a front-rear direction. It should be noted that the two batteries 510 may be placed in parallel in the front-rear direction on the left and right sides of the separator 520 shown in FIG. 6. Correspondingly, as shown in FIG. 5, each battery 510 is provided with a pressure activation piece 511 at a middle position thereof, the pressure activation piece 511 corresponding to the protection device 100 on the separator 520. The pressure activation piece 511 and the mounting base 110 may abut against each other or may have a certain gap (e.g., 0.5 mm). The first connecting assembly 10 corresponds to one of the two batteries 510 adjacent in the left-right direction, and the second connecting assembly 20 corresponds to the other one of the two batteries 510 adjacent in the left-right direction.

For the battery pack 500 according to an embodiment of the present disclosure, by providing the protection device 100 between two adjacent batteries 510, when the battery 510 has a safety hazard such as over-charge, short circuit, or over-temperature, the first connecting assembly 10 and the second connecting assembly 20 are driven to be electrically connected with close the overload protection circuit. After the overload protection circuit is closed, the internal circuit of the battery pack 500 may be cut off to prevent the battery pack 500 from being exposed to fires and explosions, thereby improving the safety performance of the battery pack 500. In addition, the protection device 100 is passive protection, thereby improving the reliability of the protection device 100, overcoming the safety hazards of fires and explosions for the battery pack 500 after the failure of the BMS, and the protection device 100 may be used as the second protection after the failure of the BMS.

The vehicle according to an embodiment of the present disclosure includes the above battery pack 500.

For the vehicle according to an embodiment of the present disclosure, by assembling the above battery pack 500, when the battery 510 has a safety hazard such as over-charge, short circuit, or over-temperature, the first connecting assembly 10 and the second connecting assembly 20 are driven to be electrically connected with close the overload protection circuit. After the overload protection circuit is closed, an internal circuit of the battery pack 500 may be fused to prevent the battery pack 500 from being exposed to fires and explosions, thereby improving the safety performance of the battery pack 500, and further improving the overall safety of the vehicle.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of this disclosure. In this specification, exemplary descriptions of the foregoing terms do not necessarily refer to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in the specification, as long as they do not conflict each other.

Although the embodiments of the present disclosure are shown and described above, it can be understood that the foregoing embodiments are exemplary, and should not be construed as limitations to the present disclosure. A person of ordinary skill in the art can make changes, modifications, replacements, and variations to the foregoing embodiments within the scope of the present disclosure.

What is claimed is:

1. A battery pack comprising a plurality of batteries, and a protecting device being disposed between two adjacent batteries and comprising:
   a first connecting assembly, electrically connected with a housing of a first battery of the two adjacent batteries, wherein the housing of the first battery has a same polarity as one electrode of the first battery;
   a second connecting assembly, electrically connected with a housing of a second battery of the two adjacent batteries, and the second connecting assembly being opposite to the first connecting assembly, wherein the housing of the second battery has a same polarity as one electrode of the second battery and has a same polarity as the housing of the first battery; and
   a conductive connecting assembly, electrically connected with terminals of the first battery and the second battery, and selectively and electrically connected with the first connecting assembly and the second connecting assembly, respectively, to form an overload protection circuit,
   wherein the protection device comprises a normal state and an alarm state,
   when the protection device is in the normal state, the first connecting assembly and the second connecting assembly are spaced apart, and the overload protection circuit is open; and
   when the protection device is in the alarm state, at least one of the first connecting assembly and the second connecting assembly moves to be electrically connected with each other and the overload protection circuit is closed to form a short circuit among the first and second connecting assemblies, the conductive connecting assembly and one of the two adjacent batteries and to cause a main loop current of the battery pack to be cut off.

2. The battery pack according to claim 1, wherein the conductive connecting assembly comprises:
   a connecting piece, having a weakened area which is fused when the protection device is in the alarm state.

3. The battery pack according to claim 2, wherein the weakened area has a plurality of through holes spaced apart from one another.

4. The battery pack according to claim 3, wherein a thickness of the weakened area on the connecting piece is less than a thickness of the remaining positions on the connecting piece.

5. The battery pack according to claim 4, wherein the first connecting assembly and the second connecting assembly each comprise:
- a mounting base, provided with a mounting hole; and
- a contact unit, received in the mounting hole of the mounting base,
- the contact unit of the first connecting assembly is configured to be in contact with the contact unit of the second connecting assembly.

6. The battery pack according to claim 5, wherein the contact units of the first connecting assembly and the second connecting assembly each comprise:
- an elastic member, fitting in the mounting hole of the mounting base, wherein a through hole is defined in the elastic member; and
- a contact portion, movably disposed in the through hole of the elastic member, and comprising a first end facing the battery opposite to the contact portion and a second end facing away from the battery opposite to the contact portion.

7. The battery pack according to claim 6, wherein
when the protection device is in the normal state, the first ends of the contact portions of both the first connecting assembly and the second connecting assembly extend from the mounting hole of the mounting base, and the second end of the contact portion of the first connecting assembly is spaced apart from the second end of the contact portion of the second connecting assembly; and
when the protection device is in the alarm state, the contact portion of the first connecting assembly and the contact portion of the second connecting assembly move toward each other until the second end of the contact portion of the first connecting assembly is in contact with the second end of the contact portion of the second connecting assembly to close the overload protection circuit.

8. The battery pack according to claim 5, wherein the first connecting assembly and the second connecting assembly each further comprise: a temperature relay, connected with the contact unit.

9. The battery pack according to claim 2, wherein a thickness of the weakened area on the connecting piece is less than a thickness of the remaining positions on the connecting piece.

10. The battery pack according to claim 1, wherein the first connecting assembly and the second connecting assembly each comprise:
- a mounting base, provided with a mounting hole; and
- a contact unit, received in the mounting hole of the mounting base,
- the contact unit of the first connecting assembly is configured to be in contact with the contact unit of the second connecting assembly.

11. The battery pack according to claim 10, wherein the contact units of the first connecting assembly and the second connecting assembly each comprise:
- an elastic member, fitting in the mounting hole of the mounting base, wherein a through hole is defined in the elastic member; and
- a contact portion, movably disposed in the through hole of the elastic member, and comprising a first end facing the battery opposite to the contact portion and a second end facing away from the battery opposite to the contact portion.

12. The battery pack according to claim 11, wherein
when the protection device is in the normal state, the first ends of the contact portions of both the first connecting assembly and the second connecting assembly extend from the mounting hole of the mounting base, and the second end of the contact portion of the first connecting assembly is spaced apart from the second end of the contact portion of the second connecting assembly; and
when the protection device is in the alarm state, the contact portion of the first connecting assembly and the contact portion of the second connecting assembly move toward each other until the second end of the contact portion of the first connecting assembly is in contact with the second end of the contact portion of the second connecting assembly to close the overload protection circuit.

13. The battery pack according to claim 10, wherein the first connecting assembly and the second connecting assembly each further comprise: a temperature relay, connected with the contact unit.

14. The battery pack according to claim 13, wherein the mounting base comprises a mounting groove, being communicated with the mounting hole, and the temperature relay is received in the mounting groove.

15. The battery pack according to claim 13, wherein the temperature relay is a memory alloy elastic piece or a bi-metal elastic piece.

16. The battery pack according to claim 10, wherein
the mounting base of the first connecting assembly comprises a plurality of assembly holes spaced apart from each other along the circumferential direction of the mounting base;
the mounting base of the second connecting assembly comprises a plurality of assembly holes spaced apart from each other along the circumferential direction of the mounting base; and
the plurality of assembly holes on the first connecting assembly and the plurality of assembly holes on the second connecting assembly are in one-to-one correspondence.

17. The battery pack according to claim 16, wherein the protection device comprises a plurality of connecting members, each respectively passing through and fitting in one assembly hole of the first connecting assembly and one assembly hole of the second connecting assembly corresponding to the assembly hole of the first connecting assembly.

18. The battery pack according to claim 1, further comprising:
- a separator, disposed between two adjacent batteries;
- wherein the protection device is embedded on the separator.

19. The battery pack according to claim 18, wherein the housing of each battery is provided with a pressure activation piece, the pressure activation piece is opposite to the first connecting assembly or the second connecting assembly, and the pressure activation piece is electrically connected with the housing of the battery; and
when the protection device is in an alarm state, the pressure activation piece is configured to push one of the first connecting assembly and the second connecting assembly to move toward the other one, such that the first connecting assembly and the second connecting assembly are electrically connected with each other.

20. A vehicle, comprising a battery pack according to claim 18.

* * * * *